W. F. STEARNS.
INSECT DESTROYER.
APPLICATION FILED JUNE 2, 1914.
1,268,640. Patented June 4, 1918.
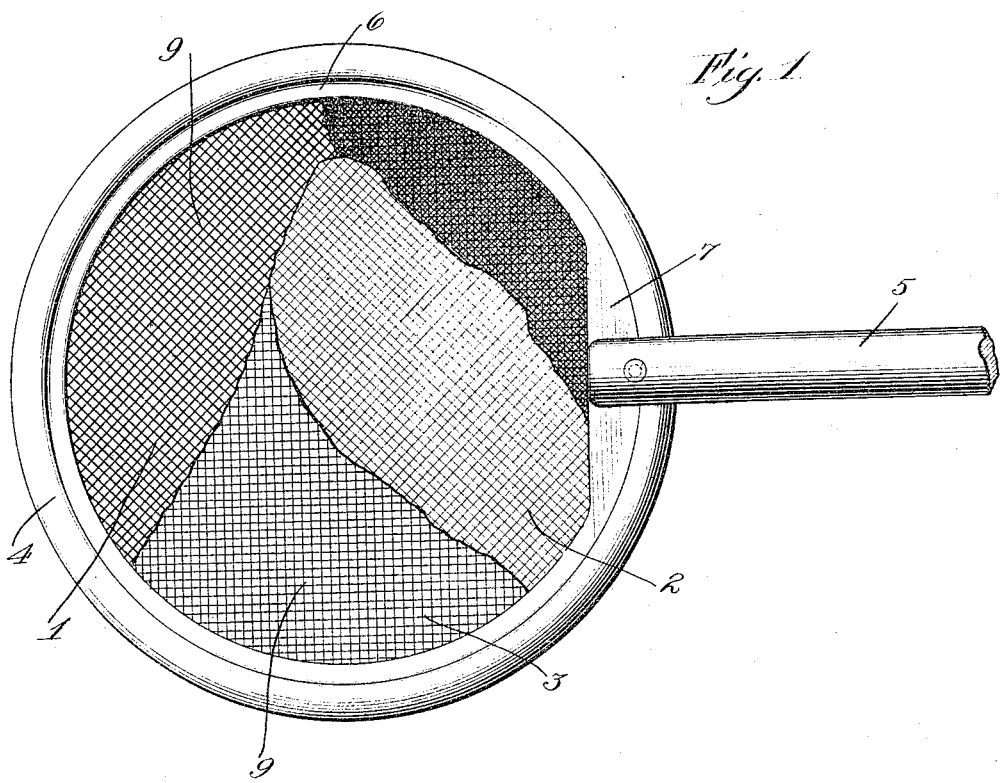
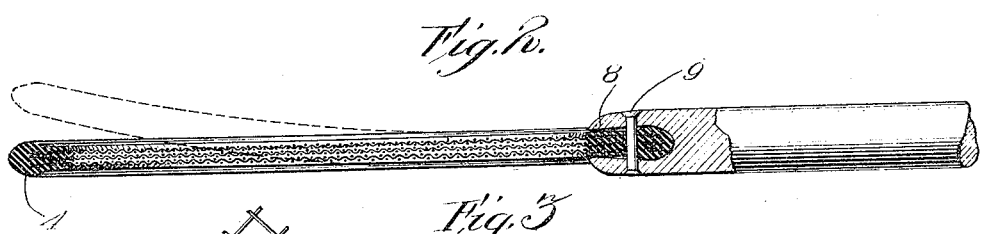
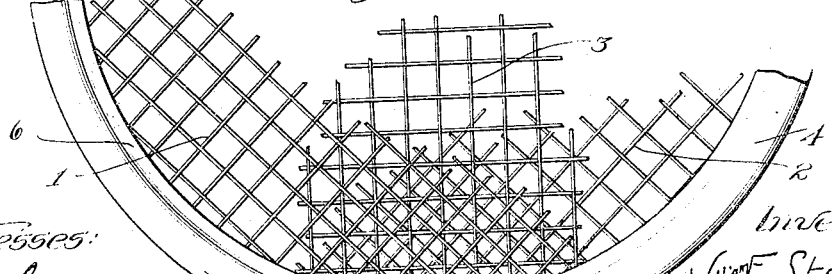
Witnesses:
Robert F. Weir
Arthur W. Carlos
Inventor
William F. Stearns
by Lotz & Scheib Atty.

UNITED STATES PATENT OFFICE.

WILLIAM F. STEARNS, OF EXETER, NEW HAMPSHIRE.

INSECT-DESTROYER.

1,268,640.  Specification of Letters Patent.  Patented June 4, 1918.

Application filed June 2, 1914. Serial No. 842,396.

*To all whom it may concern:*

Be it known that I, WILLIAM F. STEARNS, citizen of the United States, residing at Exeter, in the county of Rockingham and State of New Hampshire, have invented certain new and useful Improvements in Insect-Destroyers; and I do hereby declare the following to be a full, clear, and exact description of the invention, such as will enable others skilled in the art to which it appertains to make and use the same.

My invention relates to insect destroyers and more particularly to so-called fly swatters adapted for household or store use. One object of my invention is to provide a device of this class which may be used without producing blood spots by mashing the insects and without damaging the walls or furniture on which the insects may have settled, and which will have sufficient flexibility to adapt itself readily to the contour of the surface against which the device is struck. Another object is to provide a device of the class described having a relatively heavy but flexible frame carrying a flexible body, the flexibility of the said portions permitting a part of the frame to lag behind portions of the body and to be moved into its final position by the momentum of the said relatively heavy frame. Another object is to provide a device of the class described with a main member equipped with perforations to prevent mashing of the insects, but resilient in all lateral directions and having relatively greater resiliency in directions substantially parallel to the axis of the handle of the device.

In my previously issued patent, #1065742, dated June 24, 1913, I have shown and described an insect destroyer having a wire mesh housed by a flexible frame, the frame being equipped with a socket formation into which one end of a suitable handle is inserted. In using devices made according to this patent, I found that the resiliency of the wire mesh was not always sufficient to restore the latter to its normal plane after it had been flexed out of the same when striking the device against other than flat surfaces, and that consequently the device was apt to be bent out of shape. I have also found that this bending was particularly likely to occur on lines parallel to either of the relatively transverse wires comprising the mesh of the device. My present invention is designed to overcome these objections and also to afford a cheaper and more easily applied handle construction.

In the drawings, Figure 1 is a fragmentary plan view of an insect destroyer embodying my invention, portions of all three of the wire meshes being broken away.

Fig. 2 is a fragmentary transverse section through Fig. 1 along the axis of the handle.

Fig. 3 is an enlarged plan view of a portion of the mesh of Fig. 1 and of the frame adjacent thereto.

In the embodiment of the drawings, the device of my invention consists of three disks of foraminous material such as wire mesh superimposed upon each other and having their edges jointly embedded in a frame 4 of soft rubber. Two of the meshes, here designated as 1 and 2, preferably have their wires disposed parallel to each other, but with the overlapping meshes in staggered relation. The other mesh 3 is preferably disposed at an angle to the said meshes 1 and 2, the wires of the latter two meshes being preferably disposed at an acute angle to the axis of the handle 5 of the device. To provide an increased stiffening of the wire meshes at the portions adjacent to their juncture with the relatively heavy rubber frame 4, I preferably equip the said frame with inwardly projecting and relatively thin flanges 6 disposed upon opposite sides of the said wire meshes. I also preferably provide the said flanges at one portion with a segmental enlargement 7, which enlargement will afford an added stiffening for the portion of the main member of the device to which the handle 5 is secured. Thus, in the drawings, the handle 5 has a bifurcated end 8 straddling the portion of the frame 4 adjacent to the said stiffening formation 7, the handle being secured to the main member of the device by a rivet 9. By suitably shaping the bifurcated portion of the handle, the latter may readily be caused to clamp both a portion of the frame 4 and the adjacent portion of the reinforcing formations, thereby affording a stiffening for the flexible main member adjacent to its juncture with the handle.

It will be evident from the drawings that if the device is used on other than flat surfaces, where there may be a tendency to flex the overlapping meshes of the reticulate members of the device along any one of the wires composing the same, the said wire will be angularly disposed to a plurality of wires in at least one of the reticulate members, so that the latter will prevent an undue bending of the device. It will also be evident that in using the device, the inertia of the relatively heavy frame 4 will tend to cause the portion of the frame opposite the handle to lag behind, as shown in dotted lines in Fig. 2, and that consequently the tendency toward an undue bending of the reticulate members will be greatest along lines at right angles to the axis of the handle. I therefore not only dispose at least two of the overlapped reticulate members with their meshes relatively at angles to each other, but when using three such members, I preferably dispose two of them with their meshes at angles to the axis of the handle. By doing so, it will be evident that the said angular disposing of the meshes 1 and 2 will provide an increased resistance to a flexing of the main member of the device about lines transverse of the axis of the handle; also that by staggering the overlapping meshes of the members 1 and 2 which have their wires disposed in the same general directions, I prevent a ready flexing of the main member of the device about an edge parallel to any wire of the said overlapped members.

However, I do not wish to be limited to this particular disposition of the reticulate members, nor to other details of the construction herein described, it being evident that the same might be modified in many ways without departing from the spirit of my invention.

I claim as my invention:—

1. In an insect destroyer, a perforate flexible body portion comprising a plurality of superposed reticulate metallic sheets, the meshes of each of said sheets being out of alinement with those of the sheets next adjacent thereto and flexible means embedding and uniting the entire peripheral portions of said sheets.

2. An insect destroyer comprising a rigid handle and a flexible body portion, said body portion comprising a plurality of superposed reticulate metallic disks disposed with the meshes of each disk in staggered relation to those of the disk superposed thereon and means engaging the peripheral portions of said disks for maintaining them in said relation.

3. An insect destroyer comprising a rigid handle and a flexible body portion, said body portion comprising a plurality of superposed reticulate thin metallic meshes, with meshes of said disks being angularly disposed with respect to the meshes of the disks superposed thereon and flexible means embedding and uniting the peripheral portions of said disks and connecting the handle with the body portion.

4. In an insect destroyer a flexible body portion comprising a plurality of flat relatively superposed thin flexible foraminous metallic sheets, a flexible frame for said sheets consisting of vulcanized material completely embedding the peripheral portions of said sheets, webs integral with said frame extending inwardly thereof upon opposite sides of said sheets, and a handle embracing said webs and rigidly secured to said body member.

5. An insect destroyer comprising a rigid handle and a flexible body portion, said body portion consisting of a plurality of woven wire sheets and a flexible frame in which said sheets are secured, some of said wires being arranged parallel with and some diagonally to the axis of the handle, the rigidity of the said diagonally disposed wires being greater than that of the wires disposed parallel to said handle and said handle being rigidly secured to said frame.

In testimony whereof I have signed my name in presence of two subscribing witnesses.

WILLIAM F. STEARNS.

Witnesses:
SADIE K. MACDOUGALL,
STEWART E. ROWE.